Nov. 25, 1941.    W. PAULUS    2,264,167
WIPER BLADE MOUNTING
Filed Aug. 16, 1938
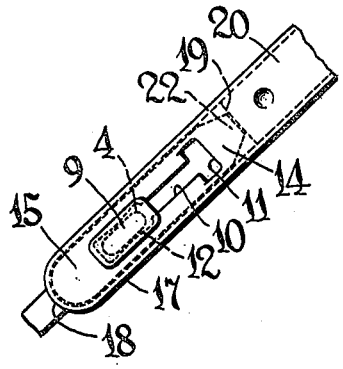
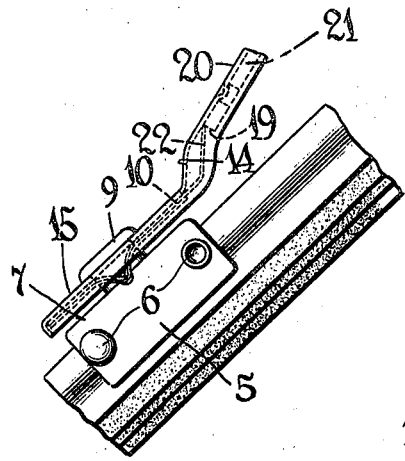
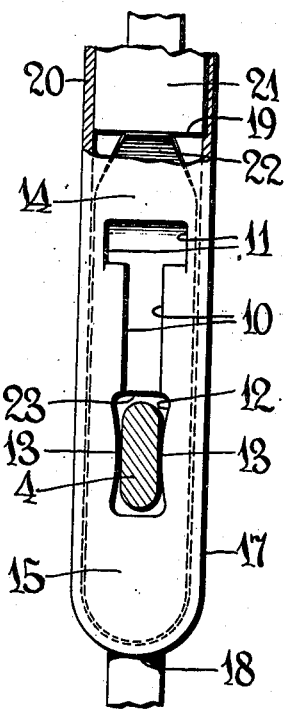
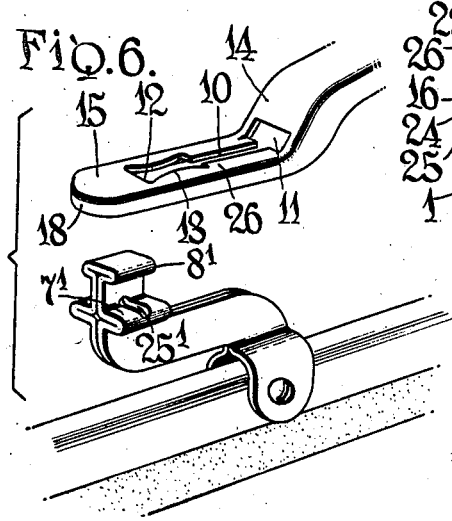
INVENTOR
William Paulus,
BY
Bean, Brooks, Buckley & Bean.
ATTORNEYS Patented Nov. 25, 1941

2,264,167

UNITED STATES PATENT OFFICE 2,264,167

WIPER BLADE MOUNTING

William Paulus, Buffalo, N. Y., assignor to Trico Products Corporation, Buffalo, N. Y.

Application August 16, 1938, Serial No. 225,108

11 Claims. (Cl. 15—250)

This invention relates to a wiper mounting for wind-shield cleaners, and it has for its object to provide a means of attachment by which the wiping blade will be securely fastened to its carrying arm against unauthorized displacement and at the same time providing the much desired flexibility in the mounting to enable the blade performing its wiping function in a most practical and efficient manner.

In the previous mounting of the blade or wiper element which has been most generally used of late, the blade has been provided with an attaching fin for hooking into a slot provided in the wiper carrying arm, such construction being more fully disclosed in Patent No. 1,946,073 dated February 6, 1934. This mounting, while being highly efficient in operation, was readily detachable and would become displaced when the arm was lifted from the glass, or it could be surreptitiously removed and thereby inconvenience the motorist.

The aim of the present invention is to provide a wiper blade which may readily be mounted on its carrying arm and secured by novel means which will serve to retain the wiper against displacement, except through the operation of specially provided means to effect its release.

The invention will be more clearly understood by reference to the accompanying drawing wherein Fig. 1 is a side elevation, partly magnified, illustrating the present invention;

Fig. 2 is a similar view in plan;

Fig. 3 is an enlarged fragmentary plan view with the stud head removed and part of the terminal ferrule broken away to expose the underlying leaf spring;

Fig. 4 is a transverse sectional view therethrough;

Fig. 5 is a detailed sectional view through the carrying arm; and

Fig. 6 is a perspective view of a modified embodiment of the invention.

Referring more particularly to the accompanying drawing, numeral 1 designates the wiper blade and 2 its carrying arm which is attached to the actuating shaft in an approved manner.

According to the present invention interlocking means are provided between the arm and blade which secures the two against unauthorized detachment. Either element is provided with a headed stud 4 rising from a base 5 which when applied to the wiper element is preferably molded to slide on the back of the blade through an interfitting relation, as shown in Fig. 4, and is secured in position by one or more fasteners 6. The base is formed with lateral shoulders 7 which are overhung by the shoulders 8 formed by the head 9. The stud is elongated in cross section lengthwise of the wiper blade.

The companion element, herein the carrying arm, is formed in its outer end with a slot 10 having an entrance 11 at one end and terminating at its opposite end in a keeper enlargement 12, the headed stud being introduced into slot 10 through the entrance 11 and moved into the retaining enlargement. The side edges of the enlargement have ample clearance to enable the blade to flop or tilt at the beginning of each stroke and are shaped with a longitudinal convexity, as indicated at 13, for rocking on the side faces of the headed stud to permit angular displacement of the blade in the plane of the glass with respect to the arm.

The entranceway 11 is formed in an offsetting shoulder 14 which defines the slotted terminal portion 15 and disposes it in substantial parallelism with the windshield surface. This will enable the outer surface 26 of terminal part 15 to fully engage the shoulders 8, as shown in Fig. 1, and when the blade is being moved on the glass surface it will assume a dragging inclination, as shown in Fig. 4, in which such outer surface will fulcrum on one shoulder only. Thus the wiper will alternately pivot on the two shoulders 8 as it is reciprocated on the windshield and will be limited in its bodily rocking movement by the engagement of the opposite convexity 13 into the shank of the headed stud. This engagement with the shoulders 8 is resiliently maintained by a bowed leaf spring 16 which is interposed between the terminal part 15 and the lateral shoulders 7, the spring being retained in position by the downturned marginal flanges 17 on the arm. For greater flexibility the bowed spring may be composed of plural leaves if desired, and in order to hold the spring in its position the forward end thereof is caused to abut the transverse marginal flange 18 while the rear end is interlocked with a shoulder 19 in a concealed location. This shoulder is conveniently provided in the present construction by stamping the terminal part 15 from sheet metal and wrapping its ferrule portion 20 about the flexible shank 21 of the arm. The rear terminal of the spring 16 is deflected inwardly behind the offsetting shoulder 14, as indicated at 22, to engage the shoulder 19, and consequently this deflected terminal is brought opposite the entranceway 11 so that by inserting a stiff wire or pin through the entranceway the locking part 22 may be flexed from engagement with the shoulder 19 and thereby permit the blade with its headed stud being slid rearwardly from the keeper enlargement 12 and out of the slot 10 for demounting the wiper.

The intermediate bowed portion of the spring 16 is formed with an opening 23 which is shaped similarly to the retaining enlargement 12 and is disposed in registry therewith. The intermediate portion of the spring, which in the illustrated embodiment defines the sides of the opening 23, is bowed downwardly to bear on the shoulders 7. This bowed portion is preferably acute so as to form a transverse ridge 24 for resiliently interlocking in a transverse seat or groove 25 formed in the shoulders 7. The ridge will be free to ride out of the seat 25 to permit movement of the wiper in the plane of the glass and relative to the carrying arm 2, but the extent of such turning movement is restricted by the longitudinal dimension of the headed stud to prevent the ridge 24 from fully leaving the seat 25. Therefore, when the pressure on the wiper is relieved the ridge will exert a camming tendency upon the wiper and return it to a position immediately beneath the arm in which position the transverse ridge fully engages its seat.

The headed stud may be stamped from sheet metal, as shown at 8' in Fig. 6, the shoulder 7' being provided with the transverse seats 25' in a manner similar to that previously described.

From the foregoing description it will be apparent that the wiping blade is locked to its carrying arm against accidental or unauthorized displacement. The locking tongue 22 is concealed to the novice and yet is readily accessible to the informed so as to permit ready replacement of the worn blade. Nevertheless the wiper is permitted that freedom of movement with respect to its arm which is so essential for efficient wiping action. The terminal part 15 of the arm is provided with laterally extending faces 26 between which and the underlying shoulders 7 the cushioning spring acts to not only normalize the wiper with respect to the glass but also to bring the wiper beneath the arm.

The construction is simple and economical in manufacture and while the foregoing description has been given in detail for the sake of clarity, it is obvious that the inventive principles involved may be applied to other physical embodiments without departing from the spirit and scope of the invention claimed.

What is claimed is:

1. Means for mounting a wiper on its actuating arm, wherein one of the elements is provided with a longitudinally extending recess, and the companion element has a projecting part loosely engageable in the recess for limited lateral play sufficient to permit the wiper to incline toward the forward side when advancing on the surface being wiped, and a leaf spring interposed between the wiper and arm, said wiper and arm having opposed faces extending parallel transversely of the wiper between which faces the spring is disposed in substantially full facial contact thereacross for urging the faces into parallelism, the face of the arm being substantially parallel to the surface being wiped, said spring having a part interlocking with a part on the recessed element and with the projecting part to secure the wiper detachably to the arm.

2. A wiper mounting comprising a blade carrying arm having a longitudinal slot in its outer end with a retaining enlargement at one end and an entranceway at the opposite end of the slot, a wiper blade having an attaching element projecting from its back in the form of a headed stud for movement through the entranceway into the retaining enlargement, the clearance between the defining walls of the enlargement and the shank of the stud defining the extent of angular displacement of the blade about the axis of the shank, and a leaf spring interposed between the wiper blade and arm and loosely engaging about the stud for movement therewith, said spring having a part interlocking with a part on the slotted element to secure the wiper blade in position, the sides of the retaining enlargement being longitudinally convex for such angular displacement of the blade about the shank axis substantially normal to the wiped surface.

3. A wiper mounting comprising a blade carrying arm having an elongated longitudinal slot in its outer end with a retaining enlargement at one end and an entranceway at the opposite end of the slot, a wiper blade having a headed stud projecting from its back and slidable through the entranceway into the retaining enlargement, said stud being loosely received by the enlargement with sufficient clearance between the walls of the enlargement and the shank of the stud to permit limited angular displacement of the blade relative to the arm about an axis substantially normal to the surface being wiped, and means between the arm and blade and interlocking behind a shoulder on the arm for securing the two together.

4. A wiper mounting comprising a blade carrying arm having a longitudinal slot in its outer end with an elongated retaining enlargement at one end and an entranceway at the opposite end of the slot, a wiper blade having a headed stud projecting from its back and slidable through the entranceway into the retaining enlargement, said stud being loosely received by the enlargement with sufficient clearance between the walls of the enlargement and the shank of the stud to permit limited angular displacement of the blade relative to the arm about an axis substantially normal to the surface being wiped, and means between the arm and blade and interlocking behind a shoulder on the arm for securing the two together, said slotted part of the arm being offset with the entranceway located in the offsetting portion, and said securing means being accessible through the entranceway to render the securing means inoperative.

5. In a wiper mounting, a wiper actuating arm element, a wiper element, and means detachably coupling the elements together for relative movement of the wiper with respect to the arm, said means including a stud carried by one element and formed with a reduced shank to provide a pair of opposed shoulders, one of said shoulders being engageable on one surface of the other element about a slot formed therein to permit limited movement of the shank therein, and a resilient member having end portions engaging the opposite surface of said other element and an intermediate portion formed with a transverse cam forming rib engaging a cam surface formed in the other of said opposed shoulders whereby the blade is resiliently cammed into and resiliently maintained in a normal position.

6. A wiper mounting comprising a reciprocatory blade carrying arm having a longitudinal slot in its outer end with a retaining enlargement at one end and an entranceway at the opposite end of the slot, and a wiper blade having an attaching element upstanding from its back in the form of a headed stud for movement longitudinally of the arm through the entranceway to engage the stud shank in the retaining enlargement, the head of the stud being of larger dimension than the enlargement to prevent its withdrawal therefrom except through the entranceway, the shank of the stud being elongated in cross section to a dimension greater than the width of the enlargement with the sides of the shank having a clearance in the enlargement permitting limited lateral swinging of the blade relative to the arm.

7. A wiper mounting comprising a reciprocatory blade carrying arm having a longitudinal slot in its outer end with a retaining enlargement at one end and an entranceway at the opposite end of the slot, a wiper blade having a headed stud upstanding from its back for movement longitudinally of the arm through the entranceway to interlockingly engage the stud shank in the retaining enlargement, the shank being elongated in cross section and having a clearance in the enlargement permitting limited lateral swinging movement of the blade relative to the arm, and means for locking the stud in the enlargement upon such longitudinal movement thereinto.

8. Means for mounting a wiper on its reciprocatory actuating arm, wherein one of the elements is provided with a recess having an entranceway and formed with a retaining portion, and the companion element has a headed stud extending perpendicular to the operative plane of movement of the element and slidable in the recess for engaging in the retaining portion, said stud providing the sole means of support for the wiper and serving to support the latter from the arm for limited relative movement about the stud axis during operation, and lock means carried by one element and engageable with the other element by and during such sliding movement for securing the headed stud in the retaining portion.

9. Means for mounting a wiper on its reciprocatory actuating arm, wherein one of the elements is provided with a longitudinal slot having an entranceway and formed with a retaining portion, and the companion element has a stud slidable through the slot into the retaining portion with a limited lateral play sufficient to permit the wiper to tilt forwardly about its wiping edge at the beginning of each stroke, and a leaf spring interposed between the wiper and arm and acting to urge the wiper upright on the surface being wiped, said spring having a part resiliently interlocking with a part on the slotted element to hold the wiper on the arm, said spring part being disposed beneath and accessible through the slot for being manually disengaged from the slotted element.

10. A wiper mounting comprising a reciprocatory blade carrying arm having a longitudinal slot in its outer end with an elongated retaining enlargement at one end and an entranceway at the opposite end of the slot, a wiper blade having a headed stud projecting from its back for movement through the entranceway and loosely engaging in the retaining enlargement, the stud shank being elongated in cross section to a dimension greater than the transverse dimension of the retaining enlargement, the clearance between the walls of the enlargement and the shank of the stud defining a limited extent of lateral angular displacement of the blade relative to the arm, and a leaf spring interposed between the wiper blade and arm, said arm having a downturned marginal flange confining the leaf spring thereon and the spring having a part yieldably pressing in a recess in the blade for camming action thereon to restore the blade to its normal position from such angular displacement.

11. A wiper mounting comprising a blade carrying arm, a wiper blade, one of the aforesaid elements having a headed stud loosely interlockable in a recess in the companion element upon relative movement lengthwise of the arm, and a leaf spring acting between the arm and a shoulder on the blade for urging the latter to a position substantially normal to the surface being wiped, said arm having a downturned marginal flange extending about the leaf spring to position the latter on the arm.

WILLIAM PAULUS.